March 4, 1958  EDWARD WEI-CHING LING  2,825,828
HIGH VOLTAGE SUPPLY DEVICE
Filed July 5, 1955  2 Sheets-Sheet 1

Inventor
E. W-C. Ling

March 4, 1958     EDWARD WEI-CHING LING     2,825,828
HIGH VOLTAGE SUPPLY DEVICE
Filed July 5, 1955     2 Sheets-Sheet 2

Inventor
E. W-C. Ling
By Glascock Downing Seebold
Attys

United States Patent Office 2,825,828
Patented Mar. 4, 1958

2,825,828

HIGH VOLTAGE SUPPLY DEVICE

Edward Wei-Ching Ling, Twickenham, England

Application July 5, 1955, Serial No. 519,838

Claims priority, application Great Britain July 8, 1954

2 Claims. (Cl. 310—68)

This invention relates to a device for supplying high electrical voltages.

The invention relates to a device for supplying high electrical voltages such as for example for testing purposes and where non-lethal currents are produced, while the object of the invention is to provide a portable supply device that may be operated either from the supply mains or if these are not available can be operated by hand.

The invention consists in a high voltage supply device comprising a generator operable by hand crank, pedals or the like or alternatively operable as a high voltage transformer in connection with a source of alternating current.

The invention further consists in a device as set forth in the preceding paragraph comprising a magnetic core, a low voltage winding on said core, a high voltage winding on said core, a permanent magnet rotor rotatable in relation to and forming part of the magnetic circuit including the core for generating a relatively high voltage in the high voltage winding, and movable core means for modifying the magnetic circuit to exclude or bypass the permanent magnet rotor so that the low voltage winding, the high voltage winding and the modified magnetic circuit constitute a transformer.

The invention still further consists in a device as set forth in either of the preceding paragraphs which, when operated as a generator includes a coil in its circuit which acts as a high inductance choke which has a saturated short circuit current characteristic at speeds of operation greater than a predetermined operating speed.

Figure 3:
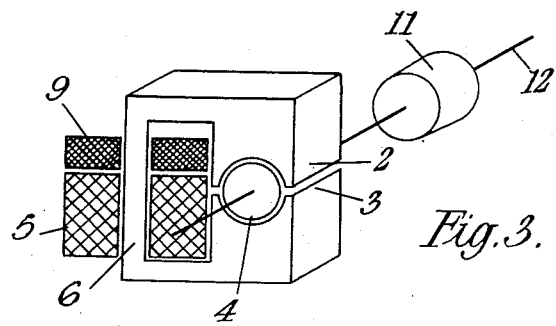
Figure 4:
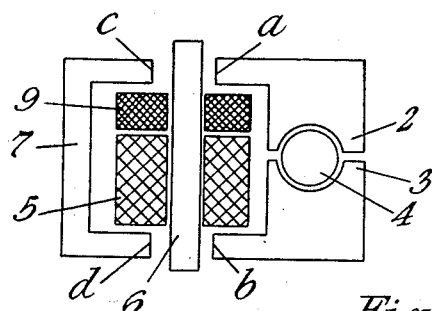
Figure 5:
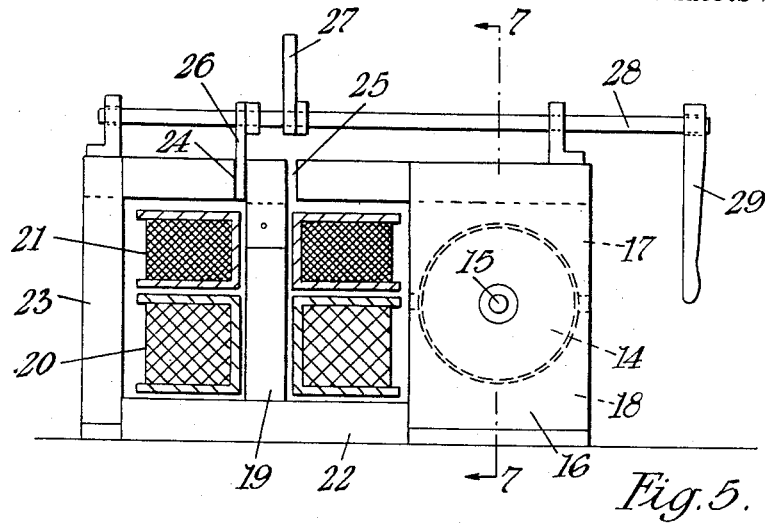
Figure 6:
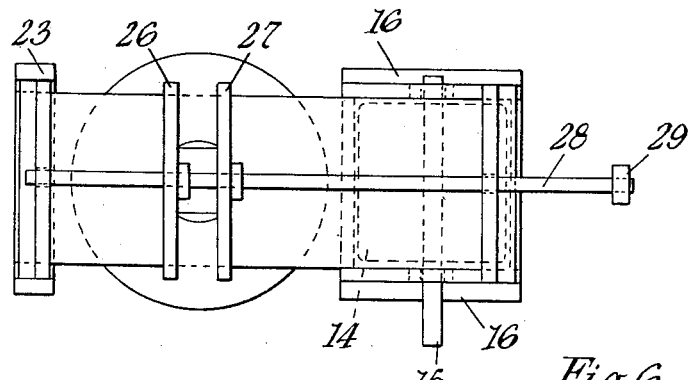
Figure 7:
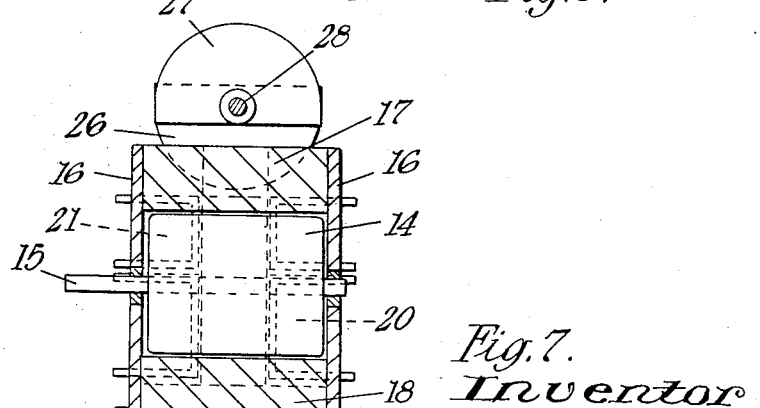

The accompanying drawings show, by way of example only, a number of embodiments of the invention in which:

Figures 1 to 4 show diagrammatically alternative arrangements for modifying the magnetic circuit of the device, while Figures 5, 6 and 7 show elevation, plan and cross section on line 7—7 on Figure 5 respectively of one practical form of construction.

When the device is operated as a high voltage generator a rotatable permanent magnet forming part of the magnetic circuit of a core induces, when rotated, a high voltage in a high voltage winding upon the core, while when it is desired to obtain a high voltage output the mains voltages are available, a low voltage winding, suitable for the mains voltage, and also upon the core induces a high voltage in the high voltage winding. The magnetic circuit being modified either by short circuiting that part of the magnetic circuit including the permanent magnet or by removing the permanent magnet from the magnetic circuit.

Figure 1:
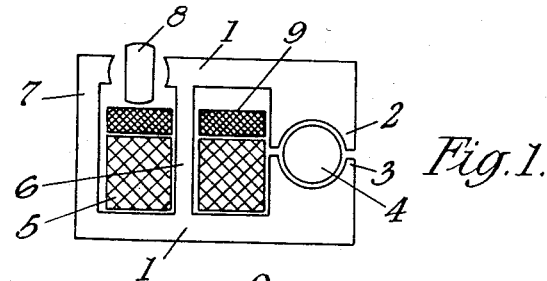

Figure 1 shows an arrangement in which the core 1 is provided with pole pieces 2 and 3 between which the permanent magnet rotor 4 may be caused to rotate by a hand crank, pedals or the like by way of suitable gearing. The high voltage coil 5 is provided around the member 6 of the core and in which the high voltage is induced. The member 7 of the core together with the rotatable member 8 may be made to act as a low reluctance short circuit path across the rotor 4 by rotating the member 8 through 90° from the position in which it is shown in Figure 1. In this case the magnetic circuit is completed around and through the coil so that upon passing a current through the low voltage coil 9 from the A. C. main supply a high voltage is induced in the high voltage coil 5.

Figure 2:
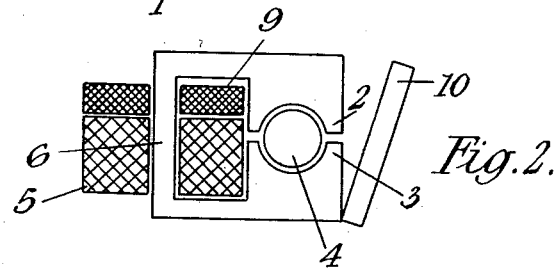

In the arrangement shown in Figure 2 the poles 2 and 3 of the core are bridged by the shunting hinge member 10 which effectively short circuits the flux around the rotor 4 when it is required for the device to act as a transformer. Alternatively, the shunting member 10 may be separate from the core and be placed in position by hand or any other suitable mechanical arrangement may be used alternatively to the hinged arrangement.

Figure 3 shows an alternative in which a permanent magnet rotor 4 and a laminated iron cylinder 11 are provided on a common spindle 12, arrangement being made for substituting the cylinder 11 for the rotor 4 when the device is used as a transformer. The cylinder serves as a flywheel when the device is being used as a generator. The spindle may be adapted to shift as a whole to substitute the one member for the other or they may be splined to the spindle and be shifted along the same to their alternative positions. If the gap between the pole pieces 2 and 3 is made slightly tapered and the laminated iron member 11 is also slightly tapered, a close contacting fit may be obtained when the latter is inserted in the former.

In the construction shown in Figure 4 the middle limb 6 of the magnetic circuit which carries the two windings is made to be shifted between two extreme positions, the one when it lies against the circuit of the pole pieces of the rotor 4 at the points $a$ and $b$ or where it lies against the low reluctance short member 7 at the points $c$ and $d$ giving alternator and transformer actions respectively.

It should be noted that with different methods of modifying the iron circuit, and consequent different magnetic characteristics, the design of the low voltage winding constituting the primary of the transformer must be suitably arranged depending on whether the modification of the magnetic circuit is carried out by substitution of or by shunting.

It should be clearly understood that the aforementioned diagrammatic arrangements are given by way of example only and that other arrangements may be provided for modifying the magnetic circuit without departing from the scope of the invention.

The arrangement of Figures 5, 6 and 7 comprises a generator having a permanent magnet rotor 14 mounted upon a shaft 15 and rotatable in bearings in the end plates 16 by way of a gear and a handle not shown. The core includes pole pieces 17 and 18 for the rotor and comprises a central member 19 upon which the high voltage winding 20 and the low voltage 21 are situated, the central member making a continuous magnetic circuit with the base member 22 leading to the pole piece 18 and the outer member 23, while the magnetic circuit above is interrupted by the two gaps 24 and 25 which may be substantially closed alternatively by the magnetic shunt discs 26 and 27 which are rotatably supported upon the rod 28 rotatable by means of the handle 29 into either of the alternative positions.

When the shunt disc 26 is in the gap 24 the magnetic circuit to the left of the apparatus as shown in Figures 5 and 6 is completed and the arrangement is usable as a high voltage transformer, while when the shunt disc 27 is in the gap 25 the magnetic circuit of the generator is complete and the portion 23 of the core is sufficiently isolated to allow the apparatus to be used in its alternative role of a high voltage generator.

The generator illustrated in Figures 5, 6 and 7 is conveniently housed in a case containing for example, meters, switches, and smoothing and voltage regulating devices, hereinafter referred to and from which the operating handle of the generator and the handle 29 protrude.

It can be appreciated that the aforegoing description is by way of example only and that details for carrying the invention into effect may be varied without departing from the scope of the invention.

I claim:

1. High voltage supply device comprising a magnetic core, a low voltage winding on said core, a high voltage winding on said core electrically insulated from said low voltage winding, a permanent magnet rotor rotatable in a gap in said magnetic core and forming part of the magnetic circuit including the core, a hand operable mechanical means for rotating said rotor to generate a relatively high voltage in the high voltage winding, and movable core means movable in relation to the said magnetic for modifying the magnetic circuit to exclude the rotor so that the low voltage winding, the high voltage winding and the modified magnetic circuit constitute a transformer.

2. High voltage supply device as claimed in claim 1 in which the core is provided with three gaps in its magnetic circuit one of which is occupied by the rotor while the other two are closed alternatively each by a movable core member to complete either the magnetic circuit of the generator or that of the transformer.

References Cited in the file of this patent
UNITED STATES PATENTS

| | | |
|---|---|---|
| 1,531,389 | Gordon | Mar. 31, 1925 |
| 2,097,577 | Seitner | Nov. 2, 1937 |